Figure 1:
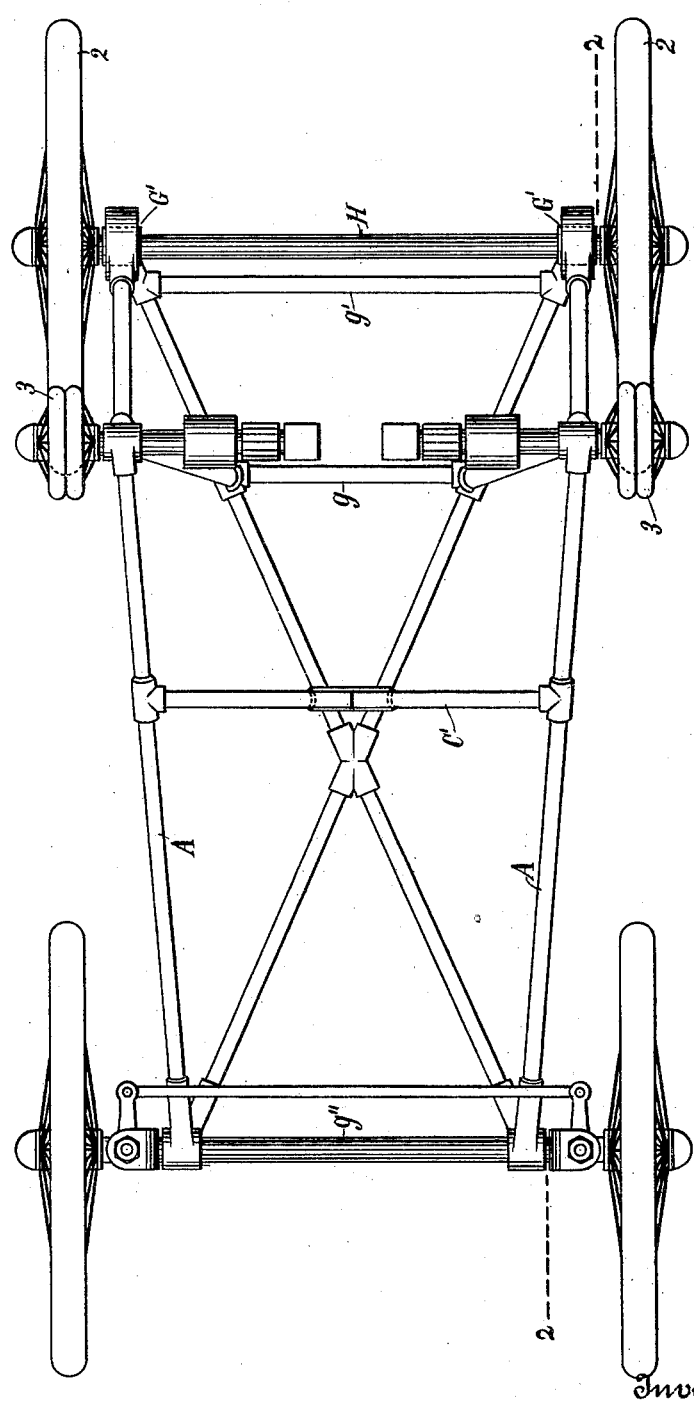

No. 695,959. Patented Mar. 25, 1902.
P. K. STERN.
MOTOR VEHICLE RUNNING GEAR.
(Application filed Mar. 21, 1901.)
(No Model.) 5 Sheets—Sheet 3.

Witnesses
C. D. Morrill
M. Blumer

Inventor
Philip K. Stern

No. 695,959. Patented Mar. 25, 1902.
P. K. STERN.
MOTOR VEHICLE RUNNING GEAR.
(Application filed Mar. 21, 1901.)
(No Model.) 5 Sheets—Sheet 4.
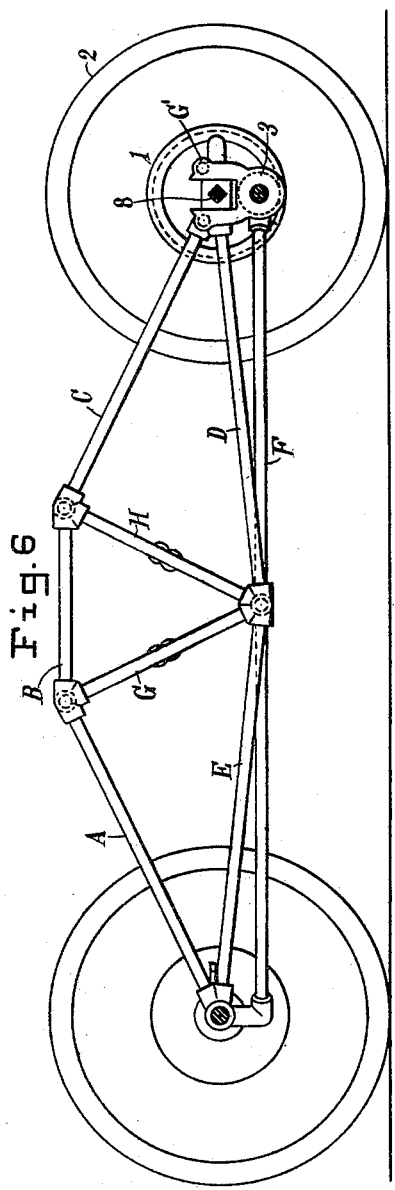
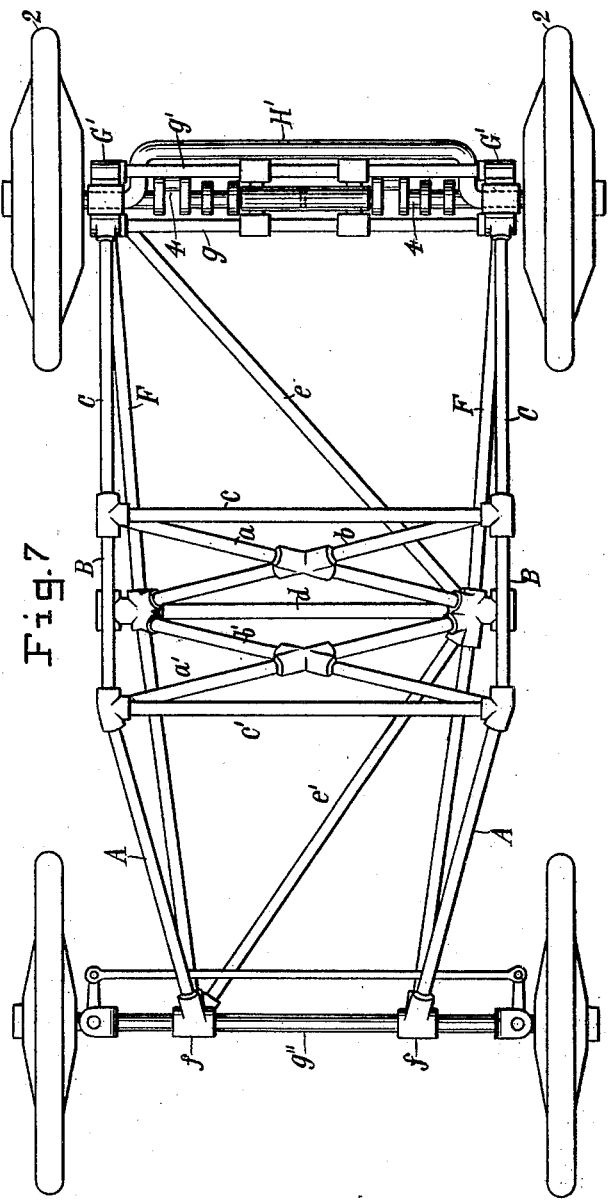

No. 695,959. Patented Mar. 25, 1902.
P. K. STERN.
MOTOR VEHICLE RUNNING GEAR.
(Application filed Mar. 21, 1901.)
(No Model.) 5 Sheets—Sheet 5.

Witnesses
C. D. Morrill
M. Blumer

Inventor
Philip K. Stern

UNITED STATES PATENT OFFICE.

PHILIP K. STERN, OF NEW YORK, N. Y.

MOTOR-VEHICLE RUNNING-GEAR.

SPECIFICATION forming part of Letters Patent No. 695,959, dated March 25, 1902.

Application filed March 21, 1901. Serial No. 52,133. (No model.)

*To all whom it may concern:*

Be it known that I, PHILIP K. STERN, a citizen of the United States, residing in the city of New York, in the county of New York and State of New York, have invented certain new and useful Improvements in Motor-Vehicle Running-Gears, of which the following is a specification.

My invention in motor-vehicle running-gears relates to those parts of the framework and propelling or driving wheels of the vehicle usually located beneath the body or box, and has particular reference to novel features in the construction of the framework and the driving-gear and to the method of their suspension, so as to effect a friction-drive by the tractive weight of the greater part of the vehicle.

One of the objects of the invention is to provide a means for reducing the rotary speed of the driven member of the driving-gear or transmission-gearing without having recourse to toothed wheels, chains, and other mechanisms which are liable to injury by coming in contact with dust, grit, &c., encountered in ordinary road traffic.

Another object of the invention is to construct the vehicle running-gear in such a manner that it will be capable of a considerable higher speed than that which could be obtained by motor-vehicles constructed on the lines of drawn wagons or those constructed on the principle of many of the older forms of motor-vehicles in vogue previous to my invention, and to this end the framework is constructed in the manner of a truss, braced both in horizontal and vertical planes and cross-braced against gyration, making the general arrangement of the framework, driving-gear, and axle more on the order of a car-truck, thereby insuring considerable strength and rigidity with a minimum of weight, affording at the same time a means of concentrating the weight of the vehicle applicable to traction at the most effective point and as low as the conditions of ordinary road travel will permit, thereby insuring greater stability to the vehicle when running at high speeds than those vehicles having their centers of gravity raised somewhat high above the road-bed.

Still another object of my invention is to provide a means whereby the wheels upon which the vehicle runs may adjust themselves to the surface of the road-bed when a rigid frame construction is employed to carry the running-gear and its load, and to this end I have designed my improved running-gear so that an axle carrying two of the running-wheels, preferably that carrying the steering-wheels, will have a rocking motion in a vertical plane independently of the framework, admitting of a twisting or gyratory movement of the wheels in the plane of the wheel-base when passing over inequalities of the road-bed common to road travel. The manner in which I carry out this feature of my invention is to apply the fifth-wheel principle at present in vogue (between the steering-axle and the body of the vehicle, permitting a rotary movement of the axle in a horizontal plane) to the axle or cross-bar which carries the two steering knuckle-jointed axles and their wheels and a rigid member of the framework in a manner whereby the cross-bar, carrying the two steering-wheels and the said axles, will with respect to the framework have a similar free rotary motion, but in a vertical plane.

The principle involved in the present invention in connection with the transmission friction-drive gearing is to provide a rolling contact between the driving member of the power-shaft of the motive-power apparatus or a rolling contact between the same and a circular track concentrically mounted on the driving-wheel, all of which will be more fully explained hereinafter in the specification and illustrated in the drawings, and particularly pointed out in the claims.

In carrying out my invention I have directed my attention to the structural methods employed in the construction of bicycles, and have therefore shown the adaptation of tubing connected by brazed and riveted joints with the usual bicycle-fittings, though it is obvious that the same general construction may be carried out by employing the usual rolled forms, such as L's, T's, or channels, or a combination of all of these.

The principle involved in a running-gear construction of this character, it will be observed, is a considerable departure from the old type of drawn wagon or many of the types of motor-vehicles in vogue at the present time, which, as is customary, are fashioned after the old horse-vehicles and in which the weight of the propelling mechanism carried by the body of the vehicle is separated from the running-gear by springs. The effect of such construction is met with many mechanical imperfections, chief among which is the disconnection of the propelling mechanism from the driving-wheels when the adjustment and registration of these two parts should be preserved at all times. In the present construction, as shown in Figures 1, 2, 3, 4, 5, 6, 7, and 8 of the drawings, I have illustrated a form of high-speed vehicle with a rigid frame construction throughout, which when operated over smooth roads or speedways will have ample provision by the inflated tires for taking up any slight jar or concussion due to inequalities in the road-bed; but for uneven road-beds, such as those encountered in ordinary road travel, the amount of elasticity afforded by the yielding of the tires would not permit sufficient freedom of motion of the vehicle in order to permit it to adapt itself properly to the surface of the road. Still less elasticity in this respect would be afforded by the use of solid tires in lieu of the inflated ones, and in order to afford a sufficient amount of flexibility to structural frameworks of the character referred to and at the same time afford the necessary amount of comfort to the occupants during travel I introduce any of the suitable usual carriage-springs between the framework and the front or steering axle, thereby admitting of a certain amount of up-and-down movement of either of the steering-wheels, which in this instance will serve as a substitute for the fifth-wheel principle before referred to, whereby the vehicle will be enabled to rest on all four wheels at the same time.

Figure 2:
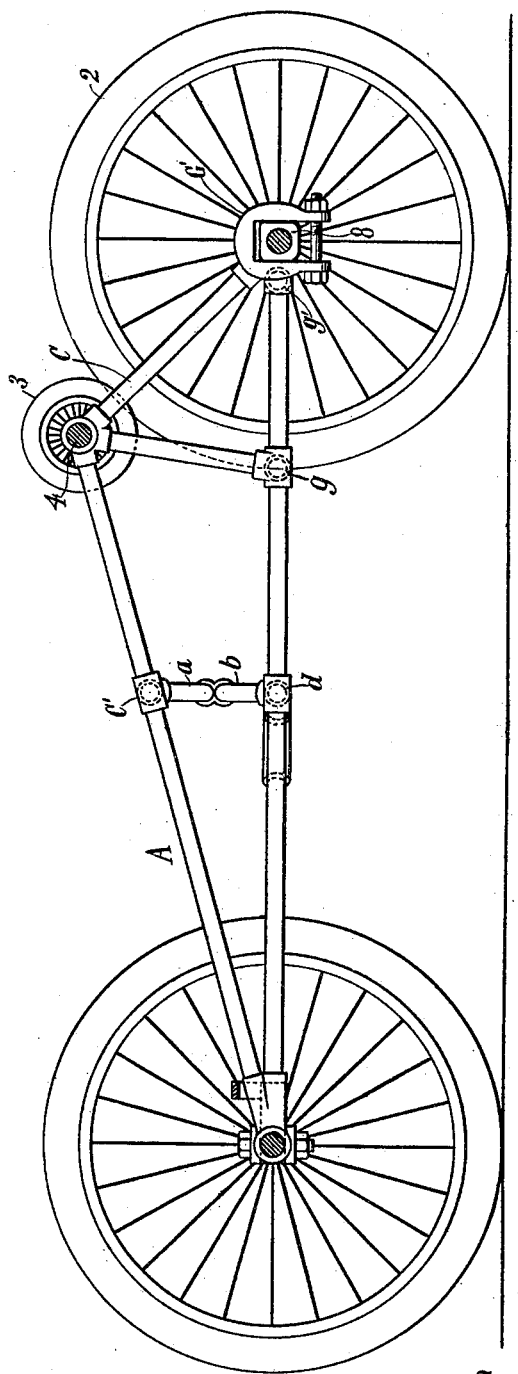
Figure 3:
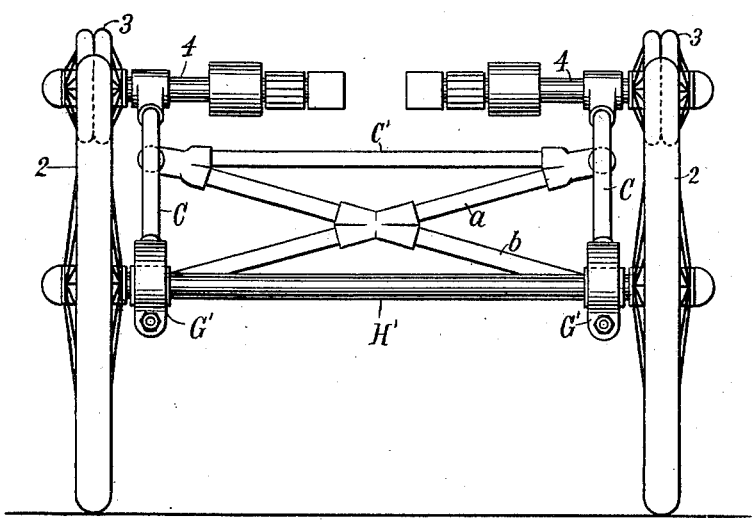
Figure 4:
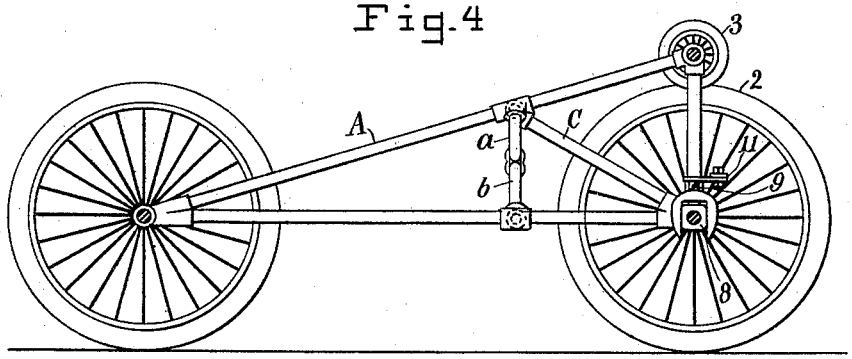
Figure 5:
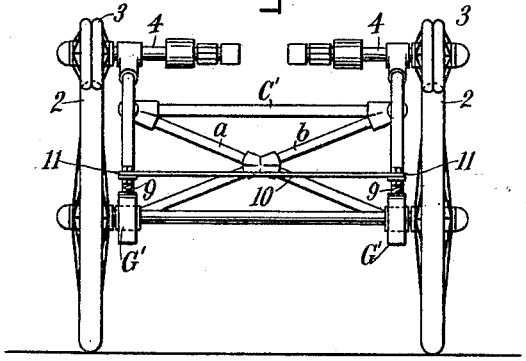
Figure 8:
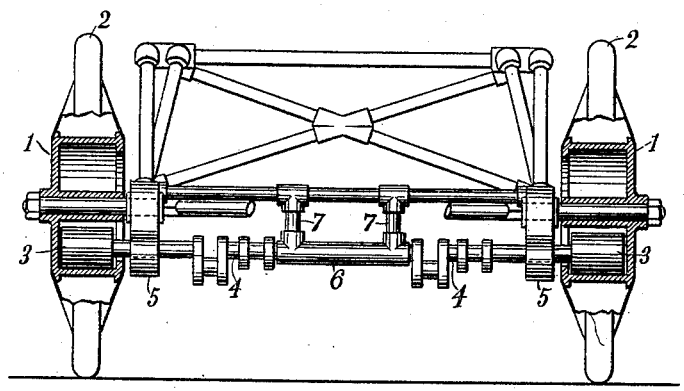
Figure 10:
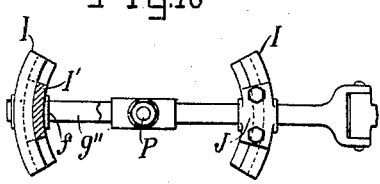
Figure 9:
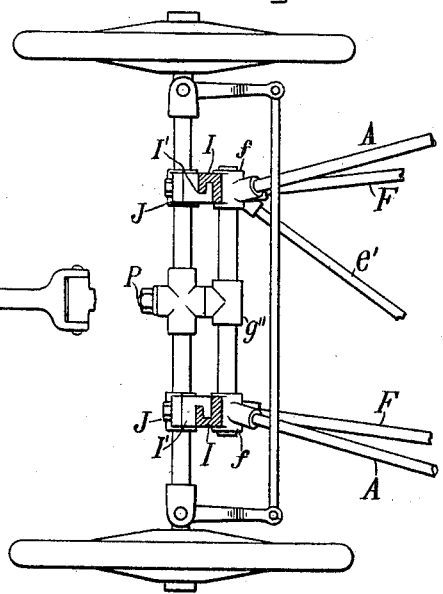

In the drawings, Fig. 1 is a top plan view of a running-gear, showing the manner in which I apply the armature-shafts of an electrical motor to the driving-gear. This figure also shows the friction-drive applied direct to the tire of the driving-wheels. Fig. 2 is a side sectional view of the same, the section being taken on the line 2 2 of Fig. 1, illustrating the principle upon which the up-and-down motion of the framework is permitted with respect to the driving-wheels. Fig. 3 is an end view of the same, which shows the bearing-boxes, motor-shaft, and cross-bracings. Fig. 4 is a modification of my invention, showing the manner of gearing in cases where heavy loads are required to be carried by the vehicle. The driver-wheels in this case are located at the top, so as to exert the greatest amount of tractive effect to the driving-wheels. Fig. 5 is an end view of the same. Fig. 6 is a side sectional elevation of a running-gear according to my invention, showing the driver-wheels internally located with respect to the propelling or driving wheels. Fig. 7 is a top plan view of the same; and Fig. 8 is an end view in cross-section, so as to more clearly illustrate the working parts. Fig. 9 is a detail plan view of the front or steering axle and the manner of connecting it with the rigid framework on the fifth-wheel principle. Fig. 10 is a detail view of the same in elevation with a part of the axle cut away and a segment of the fifth-wheel taken in section.

In the several figures the same characters of reference refer to similar parts throughout, wherein the structural framework, consisting of the trussed beam, having the struts, ties, and compression members, (depending upon the strains,)—to wit, A B C D E, cross-braces $a\ b\ a'\ b'$, cross-ties $c$ and $c'$ and $d$ and diagonal ties $e$ and $e'$, floor-beams F, terminals $f$, terminal jaws or rear forks G', and terminal ties $g$, $g'$, and $g''$—constitutes a bridge for that construction of running-gear shown in Figs. 6, 7, and 8.

I shall occasionally refer to cross-tie $g''$ as the steering-wheel axle or cross-bar which carries the two steering-knuckles and their axles.

In Figs. 6, 7, and 8 the circular tracks 1, as shown in elevation in Fig. 6 and in cross-section in Fig. 8, form the hubs of the driving-wheels 2. The motor-driven wheels 3, which are keyed and preferably shrunk to the crank-shafts 4, are in these figures shown disposed within the circular tracks 1, so as to bear vertically down upon the lower extremity of their interior periphery, and to this end the bearing-boxes 5, which carry the greater part of the load of the crank-shafts 4, are held rigidly in the preservation of perfect alinement by the terminals of the bridge construction and lie as close as is practicable to the point at which the power is to be applied to the driving-wheels 2. The disposition of the boxes 5 is clearly shown in Fig. 8. The central bearing-box 6, which carries the ends of the two crank-shafts 4, is top-braced by the two terminal cross-ties $g$ and $g'$ through the struts 7, forming at that point a sort of truss for the bearing 6. The rear axle H is bent so as to clear the cranks of the crank-shafts 4, as shown in Fig. 7, and is provided at its bearing-points with the blocks 8, which are slidingly fitted between the terminal jaws or rear forks G', so as to permit of an up-and-down movement.

In considering the disposition of the operating parts referred to adapted to drive the running-gear by the motor crank-shafts 4 it will be observed that upon rotating the crank-shafts the greater part of the weight of the structural framework being supported by the driver-wheels 3 (swinging on the axles of the steering-wheels) will be transmitted, through the circular tracks or hubs 1, to the driving-wheels 2, thence to the ground or source of traction. Therefore the traction between the driver-wheels 3 and the internal periphery of the circular track or hub 1 will be sufficient to set the driving-wheels 2 into rotation, so as to move the vehicle over its route or line of travel upon the principle of what might be termed "indirect" traction, since an intermediate traction member is introduced between the road-bed and the traction-wheels in counter distinction of a drive in which the tractive effects are obtained by the friction of the driving-wheels or traction-wheels of the vehicle. It will therefore be apparent to those versed in the art that similar mechanical propositions are to be considered with respect to the traction of the two systems, since the fundamental proposition involving frictional contact embraces the character of the materials in contact, the angle of clearance between the points in contact, and the load at these points, which are potent factors in the construction of the indirect-traction drive as well as in the direct-traction-drive gear. Therefore in considering the tractive effect of the driver-wheels 3 in the circular track or hub 1 the curve of the two contacting surfaces, the character of the material contacting, the load upon them, and the width of the surface contact must be considered in the same sense as though the driving-wheels 2 were to drive the vehicle direct.

It is obvious that the effect of driving the vehicle by the driver-wheels 3 through the intermediate circular track or hub 1 and in turn through the driving-wheels 2 would be the same on uniform surfaces, neglecting, of course, the curve of the track 1 as though the driver-wheels 3 were propelling the vehicle direct.

It will be observed that by the principle of suspending the structural framework, together with the load which is to be carried by the same, so as to swing in an arc, the greater part of the total load is transmitted as a vertical thrust in the path of that arc down upon the driving-wheels of the running-gear. It is upon this principle that I accomplish that feature of my invention involving the traction-drive, and I have shown a somewhat different disposition of the traction-drive principle, wherein the driver-wheels 3 (in Figs. 1, 2, 3, 4, and 5) are carried by the structural framework, so as to bear directly on the tires of the driving-wheels 2. With this disposition of the driver-wheels 3 upon the driving-wheels 2 I prefer to employ a double tire for the driver-wheels 3, thereby increasing the area or width of the surfaces in contact. In Figs. 1, 2, 3, 4, and 5 I have shown a bridge construction of the framework particularly adapted to this traction-drive principle, and in Figs. 1, 2, and 3 the construction of the trussed beams is such as to take up the back thrust of the driver-wheels 3 against the driving-wheels 2 and resolve the same into a vertical or downward pressure against the road-bed through the terminal jaws or forks G' and bearing-blocks 8. In Figs. 1, 2, 3, 4, and 5 the bridge construction of the framework for the corresponding parts shown in Figs. 6, 7, and 8 is referred to by the same characters of reference.

In Figs. 1, 2, 3, 4, and 5 I have illustrated a manner by which I construct my improved running-gear carried by the usual suspension or wire-spoked wheels, and in Figs. 1, 2, and 3 the construction of the structural framework is such as to permit of carrying the body or box of the vehicle lower than that construction illustrated in Figs. 4 and 5, and is consequently better adapted to that class of vehicles known as "runabouts" or light buggies, wherein it is desired to keep the body as low at least as the top of the tires of the driving-wheels 2. In the construction of the bridged framework as illustrated in Figs. 4 and 5 no lateral thrust is transmitted to the driving-wheels 2, the entire thrust of the load being directed in a vertical line and normal to the surface of the road-bed, and is therefore more adapted to heavier types of vehicles and to those in which the carrying of the body or top at a low point is not of particular importance, and to this end the adaptation of this construction is more suited to trucks, cabs, coupés, and the like.

In order to throw the driver-wheels 3 and the driving-wheels 2 in and out of gear with each other, I have arranged the lifting screws or jacks 9 (cut with a long pitched thread, as shown in Figs. 4 and 5, to engage in a nut formed in the terminal jaws or forks G') and a connecting-lever 10, secured to the crank extension 11 of the jacks 9, whereby upon swinging the lever 10 in one direction—viz., to the left in Fig. 5—the screws 9 will be thrust against the guide-blocks 8, so as to raise the structural framework (together with the load upon the same and the driver-wheels 3) sufficiently to cause the contact-surfaces of the driver-wheels 3 and driving-wheels 2 to disengage.

In the position of the screws or jacks 9 shown in Fig. 5 the driver-wheels 3 are just about to disengage from the surface of the driving-wheels 2—that is, the lever 10 is in the intermediate position. When the lever 10 is drawn over to the right, the weight, as aforesaid, will be carried by the driver-wheels 3 and driving-wheels 2, thereby reëstablishing tractive contact between the aforesaid driving members.

In making use of the term "driver-wheels" as applied to the wheels 3 and "driving-wheels" as applied to the wheels 2 I have considered that inasmuch as the principle involved in the transmission-gear requires a somewhat-different consideration than the ordinary geared transmission, in which chains or toothed wheels are employed, the driving-wheels are, in fact, the wheels 3 and not the wheels 2, and in order to avoid confusion in the expression of these two parts I have throughout the specification referred to the wheels 3 as the "driver-wheels" and have therefore applied the usual term to the wheels 2, designating them "driving-wheels" or, in some instances, "propelling-wheels." The circular track 1, serving also the purpose of a hub for the wheels 2, has been termed throughout the specification "circular track or hub," and in the disposition of this member, as shown in Figs. 6 and 8, I have illustrated a form of wheel known as the "disk wheel," the centers of which are usually composed of flat steel disks joined at their peripheries to the rims and spread apart at their axis, so as to secure the desired amount of rigidity.

In Figs. 9 and 10 I have illustrated the application of the fifth-wheel principle, before referred to, and with reference to these figures it will be observed that the terminal cross-tie $g''$ is not employed as the axle or cross-bar which carries the two steering-wheels. The cross-bar carrying the two steering-wheels is pivotally secured by a bolt or king-pin P to the terminal cross-tie $g''$, (which in this instance is employed only as a terminal cross-tie of the bridge structure,) so as to permit of a free oscillating motion in a vertical plane, the pin P being the axis of rotation. Segments of a circular track or fifth-wheel I and I' are secured, respectively, to the terminals $f$ and cross-bar or steering-wheel axle and arranged in such a manner as to secure the greatest amount of rigidity for the cross-bar or steering-wheel axle when the same encounters end thrusts or concussions met with in travel against either of the steering-wheels.

As shown in the drawings, the segments I and I' of the fifth-wheel engage after the manner of a clutch, the surfaces in contact of the engaging segments being so fitted, however, as to permit of a free rotary sliding movement when the cross-bar or steering-wheel axle is swinging upon the axis P.

The segments of the fifth-wheel I' are secured to the cross-bar or steering-wheel axle by the cap-and-bolt connection J. This manner of securing the segments I' to the cross-bar facilitates adjustment of the engaging jaws or surfaces of the fifth-wheel connection. I consider this feature of my invention of considerable importance in the application of rigid framework constructions to running-gears of motor-vehicle quadricycles, since it admits of the requisite amount of flexibility at the wheel-base, while the rigidity of the entire structure is maintained. This feature I consider an important factor in the proposition involving the construction of high-speed motor-quadricycles.

Having fully described my invention, I claim as new and desire to secure by Letters Patent of the United States—

1. In a running-gear for motor-vehicles, a driver wheel or wheels adapted to carry the tractive weight of the vehicle and adapted to rotate the vehicle driving-wheels by the traction due to the said weight, said driver-wheels being swung radially from the axle or cross-bar upon which the steering-wheels of the vehicle are mounted; substantially as described.

2. In a motor-vehicle running-gear, a structural framework swung radially at one extremity from the axle of the steering-wheels, the opposite extremity of the said structural framework having an adjustable connection with the axle of the driving-wheels, and a motor-driven traction-gear carried by the said structural framework, also carried by the driving-wheels of the said running-gear; substantially as described.

3. A running-gear for motor-vehicles having running-wheels and driving-wheels and a structural framework swung radially at one extremity from the axle or support of the said running-wheels, the same having freedom of motion at the other extremity of said framework, drive-wheels carried by the said structural framework toward the free or opposite extremity thereof, said drive-wheels being disposed upon the aforesaid driving-wheels, whereby, upon rotation of the drive-wheels, the said driving-wheels will be set into rotation by the tractive weight of the free extremity of the said structural framework and the load carried by the same, and an adjustable connection between said free extremity of said structural framework and the axle or support of the said driving-wheels; substantially as described.

4. In a motor-vehicle running-gear, having running-wheels and driving-wheels and a structural framework swung radially at one extremity from the axle of the running-wheels as the center of an arc, the opposite or free extremity of said structural framework being free to swing in said arc from said center, an axle or support of said driving-wheels being located in said arc, and a working connection between said free extremity of the structural framework and said axle, and drive-wheels carried by the said structural framework, also carried by the said driving-wheels, whereby the weight of the said free end of the structural framework and its load, upon the rotation of the drive-wheels, will rotate the driving-wheels by adhesion due to the tractive weight of the said swinging structural framework and its said load; substantially as described.

5. In a motor-vehicle running-gear having framework swung radially at one extremity from the axle of the running-wheels, motor-driven wheels carried by the other extremity of said framework, driving-wheels interposed between the motor-driven wheels and the tractive source, whereby tractive weight is transmitted through the said motor-driven wheels to and through said driving-wheels to the tractive source, and a self-adjusting connection between the said framework and said driving-wheels; substantially as described.

6. In a motor-vehicle running-gear, a framework swung radially at one extremity from the axle of the running-wheels, motor-driven wheels carried by the other extremity of said framework, driving-wheels interposed between the motor-driven wheels and the source of traction, whereby the tractive weight is transmitted, through said motor-driven wheels, to and through said driving-wheels, to the said source of traction, and an adjusting connection between said framework and said driving-wheels, and means carried by the said running-gear for disengaging the said motor-driven wheels from said driving-wheels; substantially as described.

7. In a motor-vehicle running-gear, a framework comprising longitudinal trussed beams as the side rails, cross-ties connecting said side rails to brace the same against gyration, and diagonal ties between the said side rails to prevent racking; substantially as shown and described.

8. In a motor-vehicle structural framework, a bridge trussed in a vertical and horizontal plane, said bridge being braced to resist end, axial and diagonal thrusts, vertical loads and gyration, said bridge being adapted, at its extremities, to carry the running and driving wheels; substantially as shown and described.

9. In a motor-vehicle structural framework, a bridge trussed in a vertical and horizontal plane, said bridge being braced to resist diagonal thrusts, vertical loads and gyration, running-wheels and driving-wheels connected to terminals of said bridge, a terminal of the said bridge being swung from the said running-wheels, motor-driven wheels carried by the said bridge and resting upon the said driving-wheels, an adjustable connection between the driving-wheels and said bridge-terminals, and means for raising the said motor-driven wheels from the driving-wheels; substantially as described.

10. In a motor-vehicle running-gear, a bridge having running-wheels and driving-wheels carried by its terminals, a concentric circular track carried by each of the said driving-wheels and motor-driven traction-wheels also carried by a terminal or terminals of the said bridge, each adapted to engage one of the said circular tracks; substantially as described.

11. In a motor-vehicle running-gear, a bridge having running-wheels and driving-wheels carried by its terminals and swung radially from the axle of the said running-wheels, a concentric circular track carried by each of the said driving-wheels, and motor-driven traction-wheels also carried by a terminal or terminals of the said bridge, each adapted to engage one of the said circular tracks; substantially as described.

12. In a motor-vehicle running-gear, a bridge having running-wheels and driving-wheels carried by its terminals, a vertical segmental fifth-wheel connection between one of the said bridge-terminals and the axle of the said running-wheels, a concentric circular track carried by each of the said driving-wheels, and motor-driven traction-wheels also carried by a bridge terminal or terminals, each adapted to engage one of the said circular tracks; substantially as described.

13. In a motor-vehicle running-gear, a bridge having running-wheels and driving-wheels carried by its terminals and swung radially from the axle of the said running-wheels, a vertical segmental fifth-wheel connection between one of the said bridge-terminals and said running-wheel axle, a concentric circular track carried by each of the said driving-wheels, and motor-driven traction-wheels also carried by a bridge terminal or terminals, each adapted to engage one of the said circular tracks; substantially as described.

14. In a motor-vehicle running-gear, a bridge having running and driving wheels, carried by its terminals, motor-driven traction-wheels also carried by a terminal or terminals of the said bridge, adapted to engage a concentric circular track carried by a driving-wheel of the said motor-vehicle running-gear, a jaw or fork at the terminal of the said bridge, a guide-block bearing-box disposed within the said fork carrying a journal of the driving-wheel axle of the said running-gear, said guide-block having a vertical slide adjustment within the said jaw or fork, transverse braces bridging the opposite beams of the said bridge at the jawed terminals of said bridge, a motor-shaft secured to the aforesaid motor-driven wheels, said shaft having bearings carried by the aforesaid cross-braces; substantially as described.

15. In a motor-vehicle running-gear, having a trussed-bridge framework, intermediate ties connecting opposite beams at the crown of the said beams, said ties and intermediate portions of the aforesaid beams forming, at the crown of the said beams, a seat-base or carrier-base for the portable load to be carried by the vehicle.

16. In a motor-vehicle running-gear, having a structural framework swung radially from the steering-axle or cross-bar which is adapted to carry the steering-wheels of the said motor-vehicle running-gear, a terminal cross-bar for the said structural framework and a vertical segmental fifth-wheel connection between the said terminal cross-bar and the said steering-wheel axle, said framework carrying a traction drive-gearing and motive-power apparatus for operating the same, and said framework being adapted to carry the load of the said motor-vehicle running-gear, and terminal forks for the said structural framework at the opposite extremity to the said terminal cross-bar, said terminal forks adapted to engage the axle of the driving-wheels of the said motor-vehicle running-gear, whereby the said structural framework will be swung from the said steering-wheel axle or cross-bar, so as to concentrate the weight of the free extremity of the said structural framework upon the driving-wheels of the said motor-vehicle running-gear through the said traction drive-gear; substantially as described.

In testimony whereof I have signed my name to this specification in the presence of two subscribing witnesses.

PHILIP K. STERN.

Witnesses:
M. BLUMER,
OSCAR ARONSON.